United States Patent [19]

Specktor et al.

[11] 4,195,862
[45] Apr. 1, 1980

[54] CAMBER ADJUSTING SHIM ARRANGEMENT

[75] Inventors: Gerald A. Specktor, St. Paul; John W. Solberg, Edina, both of Minn.

[73] Assignee: Shim-A-Line, Inc., Minneapolis, Minn.

[21] Appl. No.: 950,171

[22] Filed: Oct. 10, 1978

Related U.S. Application Data

[63] Continuation-in-part of Ser. No. 901,719, May 1, 1978, abandoned.

[51] Int. Cl.² .................................... B60K 17/30
[52] U.S. Cl. ................................. 280/661; 180/253; 308/244
[58] Field of Search ............ 180/43 R, 253; 280/661; 308/66, 67, 68, 244, DIG. 7; 277/2, 9, 11, DIG. 6

[56] References Cited

U.S. PATENT DOCUMENTS

| | | | |
|---|---|---|---|
| 2,772,596 | 12/1956 | Trussell | 280/661 X |
| 2,998,397 | 8/1961 | Riesing | 277/DIG. 6 |
| 3,612,538 | 10/1971 | Sievenpiper | 277/165 |
| 3,730,600 | 5/1973 | Degnah | 308/244 |
| 4,037,680 | 7/1977 | Grove | 180/43 R |

Primary Examiner—Joseph F. Peters, Jr.
Assistant Examiner—Michael Mar
Attorney, Agent, or Firm—Kinney, Lange, Braddock, Westman and Fairbairn

[57] ABSTRACT

An improved shim arrangement for adjusting the camber of a wheel in a steerable driving axle assembly, such as a front axle assembly of a four wheel drive vehicle. The shim arrangement involves a large number of tapered shims of resilient non-metallic material of high compressive strength at yield, each of which has a different maximum dimension and each of which preferably has a color corresponding to the maximum dimension of the shim. In use, a shim of the required thickness is inserted between two sections of the axle housing to adjust the angle between them and hence the camber of the wheel. Because the shims are colored, it is possible to identify the particular shim that has been used after the axle assembly has been reassembled after insertion of the shim. The shims are of a resilient plastic material such as 40% glass filled nylon. Each shim preferably has an annular rib adjacent its inner wall which engages the adjacent surfaces of the housing, or an adjacent shim, and acts as a seal.

20 Claims, 11 Drawing Figures

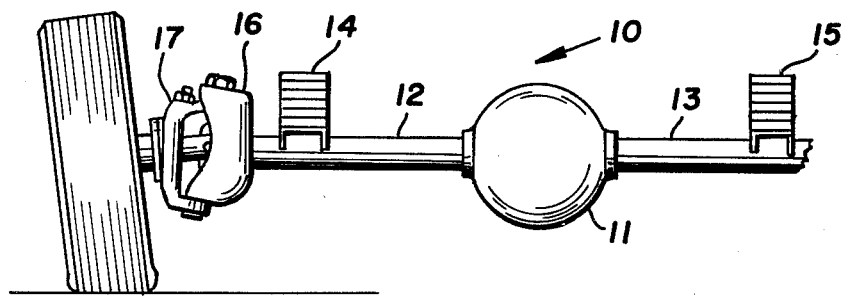
FIG. 1
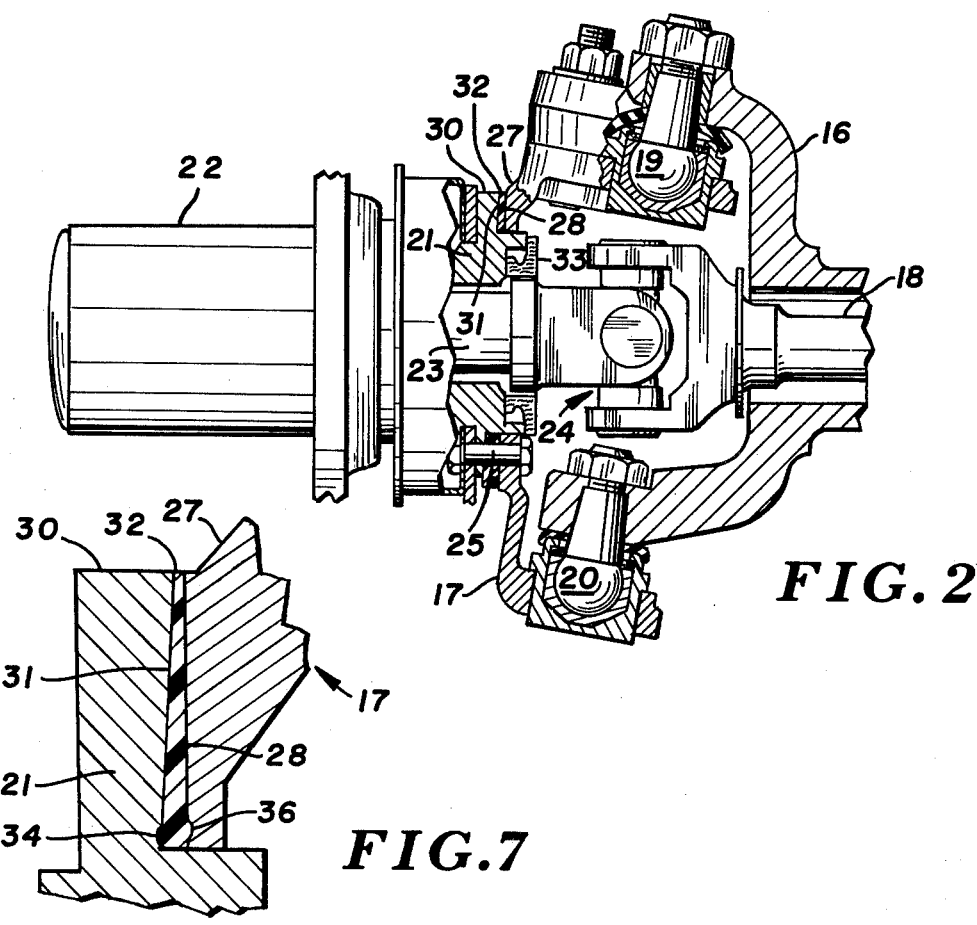
FIG. 2
FIG. 7

BLUE   GREEN   PINK   ORANGE   BROWN

CAMBER ADJUSTING SHIM ARRANGEMENT

This application is a continuation-in-part of our co-pending application Ser. No. 901,719, filed May 1, 1978, now abandoned.

This invention relates to an improved shim arrangement for adjusting and controlling the camber of a wheel in a steerable driving axle assembly, such as a front axle assembly of a four wheel drive automobile or other vehicle. We particularly contemplate making the shims of a tapered annular shape and of a non-metallic resiliently compressible material, having a high compressive strength at yield, as illustrated by a glass filled nylon, as distinguished from the commonly used steel shims which are relatively non-compressible in use as a shim. Our shim may be employed between the mating faces of a drive axle housing and a driven axle housing (or spindle) of a steerable driving axle assembly, and one or more shims may be employed to correct or adjust the camber of a wheel. A number of advantages flow from the use of our resiliently compressible shims, as compared with steel shims, and from the specific, preferred embodiments thereof.

BACKGROUND OF THE INVENTION

Various attempts have been made to develop a satisfactory method of adjusting the camber of a wheel in a steerable driving axle assembly, such as a front axle assembly of a four wheel drive vehicle. Illustrations of such follow.

For example, B. W. Keese U.S. Pat. No. 2,356,146, granted Aug. 22, 1944, discusses this problem at page 1, column 1, lines 37–42 and at page 3, column 1, lines 41–49. Note that the Keese patent provides for machining "the abutting faces 79 and 81 of housing portions 51 and 52" to control camber. In place of machining such abutting faces, others have proposed the use of shims which, we believe, have commonly been metal shims. In this connection, note the Thomas U.S. Pat. No. 3,253,670, granted May 31, 1966, column 4, lines 59–73, and the Ainsworth U.S. Pat. No. 3,605,930, granted Sept. 20, 1971. Note that the Ainsworth patent at column 1, lines 47–49 and lines 66–68 refers to the use of shims by which the camber of the wheel can be changed. There have also been suggestions that cams be employed to adjust the camber of a wheel in a steerable driven axle assembly; for example, see Trussell U.S. Pat. No. 2,772,596, granted Dec. 4, 1956 which shows tapered shims for camber control.

Even earlier the idea of using annular tapered rings to control the angle between the wheel spindle and the axle of a vehicle, and thus to control the camber of a wheel, was disclosed in Cooper U.S. Pat. No. 774,042, granted Nov. 1, 1904.

Another example of the use of shims for adjusting camber is contained in the recently issued Grove U.S. Pat. No. 4,037,680, granted July 26, 1977. This patent, like a number of others in this art, does not state the material out of which the shim is made but, in view of the rugged use and stresses to which it is subjected, we believe that the average person skilled in the art (absent other information) would assume that it was made of metal, particularly steel; and, based upon our information and belief, the shims which have been sold during the last few years by Grove or his exclusive licensee, Cosmos Enterprises, Inc., Elbow Lake, Min., have all been metal shims, particularly steel shims.

In the case of an ordinary vehicle in which the front axle is not driven, the problem of controlling camber of a front steering wheel of a vehicle is relatively simple. The axle is not rotating and all that is necessary to do is to adjust the angular position of the stub shaft carrying the wheel hub with respect to the main portion of the axle. Where, however, the axle is driven, as in a four wheel drive, the adjustment must be made in the housing adjacent the universal joint between the driving axle and the driven stud axle. In some cases, this has been accomplished by simply bending the main axle housing. As above stated, it has also been proposed to insert shims between two sections of the axle housing which are normally clamped together, the shim resulting in a change in the angular relationship between the main housing and the housing surrounding the driven stub shaft.

One problem in connection with previously suggested shim arrangements is that these shims have been made out of relatively incompressible metal and, because they have been made of metal, have usually all been of the same color. This has produced a number of drawbacks. In the first place, the shim is relatively non-compressible and it is difficult to get an adequate or desired seal between the two sections of the housing after they are clamped together. Furthermore, because the shims are all of the same color, regardless of the thickness, it is impossible, once the vehicle has been reassembled, for someone to know what size shim was used. Moreover, the insertion of a metal shim tends to decrease the minimum force required to loosen the screw threaded fastening means holding the axle housing sections together.

SUMMARY OF THE PRESENT INVENTION

The present invention is concerned with an improved shim arrangement for adjusting the camber of a four wheel drive vehicle in which the shim inserted between the sections of the axle housing is one of a number of shims, each of a different maximum thickness and each of a color corresponding to the thickness so that the thickness of the shim is readily identifiable from its color. The shims are preferably tapered shims.

Furthermore, the shims are made of a non-metallic, resiliently compressible material. This greatly aids in the sealing action. To further enhance the sealing action, the shim is provided with an annular ridge on at least one of its faces. Preferably, such an annular ridge is provided on each face. The annular ridges are relatively narrow and engage the mating surfaces of the housings. Because they are narrow, the compressive force per unit area of engagement with the mating surface is very high when the two housing sections are bolted or otherwise clamped together and a very excellent seal is produced.

The shims are preferably annular, having a plan configuration similar to that of at least one of the mating surfaces. The material of which they are formed may be of any suitable non-metallic material having sufficient resilience and strength, especially a tough, strong, resilient synthetic plastic material having a filler of glass beads or other small particles. One particular material which has been used and found to be particularly suitable is a bead filled Nylon.

Because the shims are formed of a resiliently compressible material, the minimum force required to loosen the screw-threaded fastening means tends to be higher than when a metal shim is used or when no shim is used. This lessens the likelihood of the axle sections loosening up with use.

DESCRIPTION OF THE DRAWING

FIG. 1 shows in somewhat simplified form a front axle assembly of a four wheel drive vehicle;

FIG 2 is a view partly in section of one end of the axle assembly of FIG. 1;

FIG. 7 is a fragmentary portion of FIG. 2, but on a much larger scale to show the position of the sealing ridge of the shim when assembled;

DETAILED DESCRIPTION OF THE INVENTION

Figure 9:
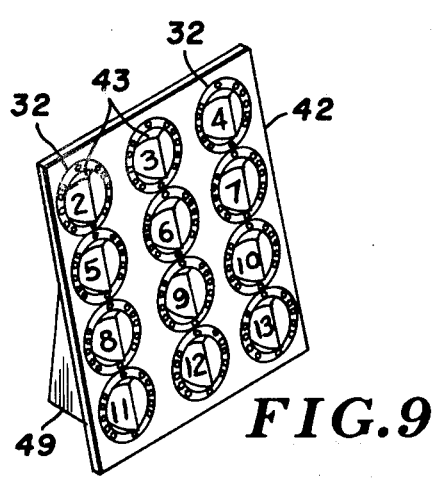
FIG. 9 is a view of a rack for holding the shims so that they are readily available for use by a mechanic.

Referring first to FIG. 1, the numeral 10 is employed to designate a front axle assembly for driving the front wheels of a conventional four wheel drive vehicle. The front axle assembly comprises a conventional differential located in the housing 11 which is secured to axle sections 12 and 13. These axle sections support by suitable spring means 14 and 15 the front portion of the automotive vehicle. It is understood that springs 14 and 15 are connected to the vehicle frame in a conventional manner. Each of the axle sections 12 and 13 is hollow and supports a driven axle member which is driven through the differential housed in housing 11. The driven axle of axle section 12 is shown in FIG. 2 and is designated by the reference character 18. Secured to the left-hand end of axle section 12 is a yoke 16 which is pivotally secured to the steering knuckle 17 by ball joints 19 and 20. Connected to the steering knuckle 17 is a spindle 21 which rotatably supports a wheel hub 22. The wheel hub 22 is driven by a stub shaft 23 connected to driven shaft 18 by a universal joint 24. The stub shaft 23 drives the hub 22 through a suitable splined connection (not shown) in a manner which is old and well known. The spindle 21 is secured to the knuckle 17 by a plurality of bolts 25 (only one of which is shown) which are spaced annularly around the spindle and serve to clamp the steering knuckle 17 and the spindle 21 together. Steering knuckle 17 is provided with an inwardly extending flange 27 which has an outer face 28. The spindle 21 has an outwardly extending flange 30 with an outer face 31 facing the outer face 28 of the flange 27 of the steering knuckle 17. When no camber adjustment is necessary, and when the spindle 21 and the steering knuckle 17 are clamped together, faces 28 and 31 are in tight engagement with each other by reason of the clamping action of the bolts 25. Our invention is concerned with the interposition between the faces 28 and 31 of a tapered shim 32 which acts to vary the angular relationship between the steering knuckle 17 and the spindle 21 and hence between the main axle 15 and the stub axle 23. It is old to provide such a tapered shim for adjusting camber and my invention is specifically concerned with a new and improved type of shim, which will be presently described.

The space between the axle 23 and the spindle 21 is sealed against the escape of grease therefrom by a suitable rotary seal 33 of conventional construction. Such a seal permits relative rotation between the parts while maintaining a seal. Such a seal is desirable since the space around the stub shaft 23 must be (or may be) filled with a lubricant.

Figure 3:
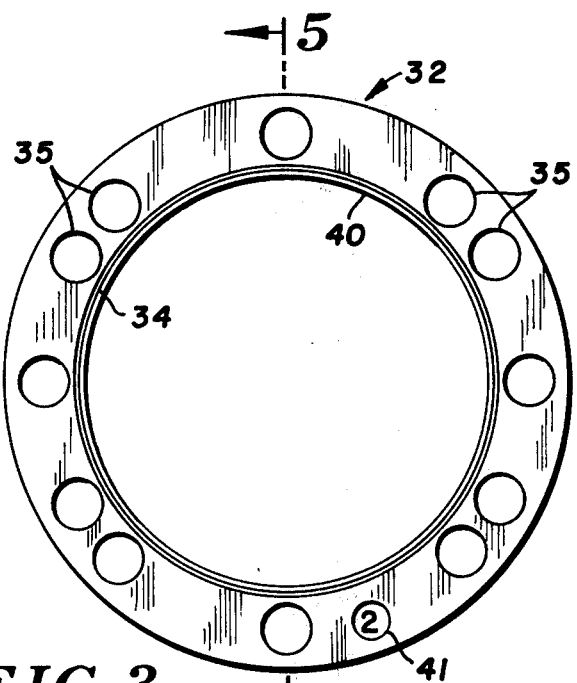
FIG. 3 is a front elevational view of one of the shims of the present invention.

Referring now to FIG. 3, the shim 32 is shown in a front elevational view. It will be noted that the shim is of an annular configuration and has an inner bead 34 projecting upwardly therefrom. This bead will be described in connection with FIGS. 4, 5 and 6. Extending through the shim at various points are holes 35 of a diameter to receive the bolts 25 and which are spaced in such a manner to conform with the spacing between the bolts on various vehicles. In other words, for any one vehicle, only certain of the apertures 35 will be used, the apertures being used corresponding to the particular bolt apertures employed in the vehicle in which the shim is being inserted.

The shim of our invention, unlike those of the prior art, is formed of a plastic material which is yieldably compressible, especially a synthetic resin or polymer containing a suitable filler, preferably a filler having a strength such as small glass particles or beads. A material which we found particularly suitable for this purpose is a material commercially known as Nylon 6,6, having glass beads added thereto as a filler. Such a glass bead filled material is marketed by Adell Plastics, Inc., Baltimore, Md., as its AB Series, its AB-14 Nylon plastic material being 20% glass bead filled, its AB-16 plastic being 30% glass bead filled, and its AB-18 plastic being 40% glass bead filled (i.e. 40 lbs. of glass beads and 60 lbs. of Nylon 6,6). Such a material has a tensile strength of from 12,500 to 14,000 lbs. per square inch and an ultimate elongation of from two to six percent, both properties being measured by employing the D-638 testing method of the American Society of Testing Materials (ASTM). The material also has a flexural modulus of elasticity of from 575,000 to 700,000 lbs. per square inch and a flexural strength of 15,000 to 18,000 lbs. per square inch, both properties being measured when testing the material using the D-790 method of testing of ASTM. The material also has an Izod impact strength of from 0.60 to 0.70 ft-lb/in, when the thickness of the material is ⅛ inch. This property is measured by employing the D-256 test of ASTM. Using the D-621 test of ASTM, the deformation under load at 2000 psi and 122° F. ranges from 0.8 to 1.2 percent.

There are a number of other properties of this material which are very important. For example, because the shim 32 is clamped tightly by the bolts 25, it is important that it have a very high compressive strength at yield. Measured by the ASTM method D-695, the materials described above have a compressive strength at yield of between about 29,000 and about 36,000 or 36,500 lbs. per square inch. The 20% glass bead filled Nylon shows a compressive strength at yield of the order of 29,000 lbs./sq. in.; the 30% glass bead filled, about 34,000 lbs./sq. in.; and the 40% glass bead filled, about 36,500 lbs./sq. in. While the range of glass bead fillers and compressive strengths indicated is a preferred range, the material of our nonmetallic shims may have a compressive strength below or somewhat above this range. For example, the percentage of glass bead filler may be increased to about 50%, more or less, so as to bring the compressive strength up to about 40,000 lbs./sq. in., or perhaps somewhat higher, taking care not to carry the addition of filler to the extreme that the shim is not sufficiently resilient, coherent and yieldably compressible, or lacking in uniformity. On the other hand, the percentage of glass bead can be reduced below 20%, e.g. down to 10% or, for some less rugged uses, even down to 5%, with compressive strengths at yield ranging upwardly from about 17,000 lbs. per sq. in. The materials having the broadest utility in our shims, however, have compressive strengths at yield within the range of about 25,000 to about 38,000 or 40,000 lbs./sq. in. The material of our shims should also have a relatively low coefficient of linear thermal expansion. The Adell Plastic material above mentioned has a coefficient of expansion of between 2.9 and $3.2 \times 10^{-5}$ inches per inch per degree Fahrenheit on tests using the D-696 ASTM method. This compares with the coefficient of thermal expansion for steel of 8 to $9 \times 10^{-6}$ inches per inch per degree Fahrenheit. Thus, the material has a much lower coefficient of thermal expansion than steel. Another property that is of importance is that the melting range be higher than would normally be encountered in the operation of an automobile. The material suggested above for use in making the shims has a melting range of from 480–500° F. This obviously is well above temperatures which would be encountered in the operation of the vehicle. It will thus be seen from the above that the material named is highly suitable for use in the shims and produces a shim which will perform very satisfactorily under the rigid conditions necessary for such a shim. It will not appreciably change its thickness under load and has a very low value of deformation under load. It has a very low coefficient of linear thermal expansion and will not appreciably change in thickness with change in temperature. It has various other properties suitable for the purpose.

While I have named specific materials as being useful, it is to be understood that other resiliently compressible non-metallic materials, especially synthetic resin or plastic materials, which are capable of performing the desired function may be used. The material named is merely named as one typical polymer material which has been found very satisfactory in actual use. Other suitable plastics or polymers may be selected, especially from among some of the newer synthetic polymers or plastic materials, e.g., the polycarbonate resins (a specific kind of a polyester terephthalate polymer) sold under the trade name LEXAN by General Electric Co., which are moldable, or from among certain of the so called SBA (or ABS) resins, i.e. the styrene butadyene acrylonitrile resins, or from among other synthetic plastics of suitable properties.

The glass bead filler, or equivalent, may have a particle size, or a range of particle sizes, much less than 0.020 inch, e.g. about 0.005 inch and less, and may resemble powdered sugar.

Care should be taken to get a uniform blend of the glass beads with the nylon resin or equivalent, or the glass filled nylon may be purchased in a preblended form, e.g. from Adell Plastics, Inc., Baltimore, Md., Plastic Trading, Winona, Minn. or others. Where glass fibers are substituted for glass beads, the glass fiber filled nylon can likewise be purchased, preblended, in pellets or little spaghetti-like pieces from DuPont, Wilmington, Del., under the trade name "Zytel" in a variety of percentages of glass fibers to nylon 6,6, including 13% glass fiber reinforced (13 lbs. glass fibers to 87 lbs. of nylon 6,6), designated by DuPont as "Zytel 70G-13L", 33% glass fiber reinforced (33 lbs. glass fibers to 67 lbs. nylon 6,6), designated as "Zytel 7 G-33L", and 43% glass fiber reinforced (43 lbs. glass fibers to 57 lbs. nylon 6,6) designated as "Zytel 70 G-43L". All of these variations of glass filled nylon or equivalent are useful in making our shims, and provide compressive strengths at yield of 25,000, 35,000 and 35,500 lbs./sq. in., respectively. With the use of a different polymer, it is possible to increase or vary these compressive strengths. Others, e.g. LNP Corporation, Malvern, Pa., also make glass fiber filled nylon, in pellet form, including 50% and 60% glass fiber filled nylon. The glass fibers are very fine, e.g. 0.005 inch or less, with a length of less than about $\frac{1}{8}$ inch, e.g. 0.01 to 0.02, more or less.

Figure 4:
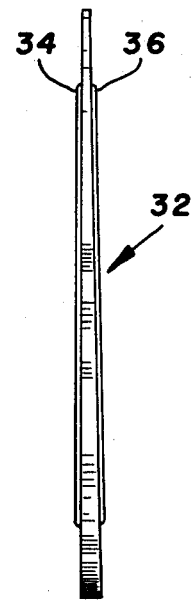
FIG. 4 is an edge elevational view of the shim of FIG. 3.
Figure 5:
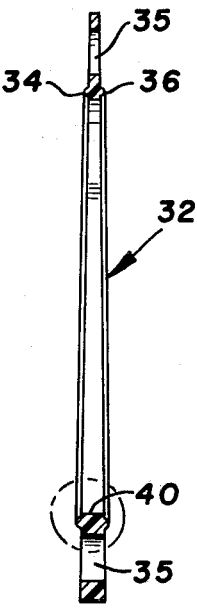
FIG. 5 is a sectional view taken along the line 5—5 of FIG. 3.
Figures 6, 6A:
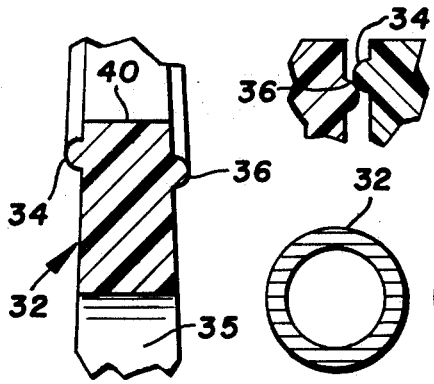
FIG. 6 is a fragmentary sectional view showing the portion of FIG. 5 encircled in a dotted line, but on a larger scale.
FIG. 6A is a fragmentary view of engaging portions of two shims having the relative position of the ridges of the two shims as they are being tightened together.

Referring back to the structure of the shim, and referring specifically to FIGS. 4, 5 and 6, there are two annular ridges 34 and 36 which project from opposite faces of the shim 32 and extend around the inner annular surface of the rim. The nature of these annular ridges is best shown in the fragmentary view of FIG. 6 where the ridges are shown on a somewhat larger scale and exaggerated in size for purposes of illustration. It will be noted from FIG. 6 that the annular ridges 34 and 36 are not exactly at the edge 40 of the annular opening in the shim 32. Rather, they are spaced slightly inwardly. The ridges 34 are, for example, spaced in a distance of 0.02 inch from the edge 40 of the annulus. The annular ridge 36 is, on the other hand, spaced in a distance of only 0.012 inch. The advantage of this is that the ridges are slightly staggered with respect to each other and if two shims are used together to attain the desired correction, the ridge 34 on one shim will be outside of and slightly overlap the ridge 36 on the other shim. Thus, as they are clamped down, the two ridges 34 and 36 will engage each other side by side and compress together.

We also contemplate using two or more annular ridges on one or both sides of our shim, as a further aid in getting good performance characteristics, preferably arranging them to cooperate as above described. Where they are two or more annular ridges on one side of our shim, they will be radially displaced from each other, e.g. half the radial width of the annulus.

The shims 32 are of varying thicknesses to obtain varying amounts of camber adjustment. Since the thinnest portion of the shim always has to have a certain amount of thickness, e.g. 0.02 inch minimum, in order to have any appreciable structural rigidity, the shim is designed to provide a predetermined difference in thickness between the thick portion of the shim and the thinnest portion of the shim. This difference, in case of a shim having an outside diameter of $4\frac{3}{4}$ inch, for example, may vary from as little as 0.02 inch, or thereabouts, to as high as about 0.13 inch or higher. To get the same angular correction, such difference would be greater with larger diameter shims, e.g. 6 inch diameter shims, and less with smaller diameter shims. If it is desired to obtain a greater amount of difference, and, hence, correction in camber, than can be obtained with a single available shim, it is possible to place together two shims, selected to collectively provide the desired amount of difference between the thick end and the thin end.

Our 4¾ inch outside diameter shims, as now sold by our assignee, have a number molded and recessed in the mating surface of each shim, each number designating a certain difference in thickness between the thickest and the thinnest portions of our annular shim and hence a different degree of angular correction of camber. The numbers run from 2 to 13. For example, the number "2" shim will provide a 2/8 degree correction of camber, the number "3" shim will provide a ⅜ degree correction, the number "4" shim will provide a 4/8 degree correction, and so on, with the number "8" shim providing one full degree of correction of camber, and the number "13" shim providing 1⅝ degrees of correction. (Currently we are not making a number "1" shim.) Each shim is of a color to match its thickness, a shim providing a 2/8 degree correction in camber being of one color, a shim providing a ⅜ degree correction being of another color, and so forth. Thus we provide 4¾ inch shims of 12 different colors. The colors may be added to the reinforced plastic or polymer before it is injection molded to produce our shims.

A comparable numbering and coloring system is contemplated with larger or smaller diameter shims.

Referring back to the annular ridges 34 and 36, these ridges are relatively small in height compared with the shim. In a typical case, the ridge is 0.015 inch wide at its base and has a height of 0.010 inch. When the shim is placed in position and the nuts 25 are clamped, the ridges are slightly compressed despite their very slight deformation under load which takes place with the material. The reason for this is that because of the very small width of each annular ridge 34 and 36, the force in pounds per square inch as applied to this ridge becomes extremely high as the bolts 25 are clamped. By the time that the bolts 25 are clamped, the ridges will each have a height of approximately 0.005 inches. This very slight ridge is basically negligible as far as holding the faces 28 and 31 spaced from the rest of the annular surfaces of the shim is concerned. In other words, even though the ridges are still projecting slightly away from the face of the shim, the projection is so slight that over almost all of the area of the shim, the faces 28 and 31 will be clamped against the surface of the shim. At the same time, because of the tremendous compressive force exerted on ridges 34 and 36, the material is thoroughly forced into any minute irregularities in faces 28 and 31 and a thorough seal is provided.

A thorough seal at this point is desirable for a variety of reasons. In the first place, in some units the yoke and the spindle 17 are semi-spherical and are mounted so as to be in movable sealing engagement with each other, so that the housing including the universal joint 24 is sealed from the atmosphere. In such case, there is grease within the chamber formed by the yoke 16 and the steering knuckle 17 and a seal around the shim 32 is very desirable.

In actual practice, a plurality of these shims, each of a different thickness and each of a different color, are provided. Each shim has a number thereon, the number being related to the difference in thickness between its thickest and its thinnest portion. Thus, the shim shown in FIG. 3 has the number "2" thereon, then being identified by the reference numeral 41. The number may be applied by molding the number into the material as the shim is made. The mechanic is provided with a chart to show the number of the shim that should be used for the desired amount of camber correction.

Figure 10:
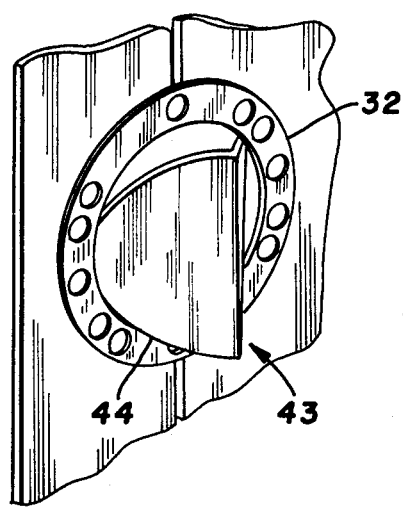
FIG. 10 is a detail of a portion of the rack showing the manner in which the shims are supported.

In FIG. 9, we have shown a rack which is of the type employed in a garage for holding the shims. This rack is designated by the reference numeral 42 and comprises a plurality of supports 43 which project outwardly from the face of the rack and are of such a diameter as to receive the shims 32. I have shown such a support 43 in more detail in FIG. 10. It will be noted that it may be formed out of a folded piece of cardboard 44 which is folded out from the material of which the support 42 is made. This arrangement provides for a very simple inexpensive series of projections 43 over which the various shims are placed. As will be noted from FIG. 9, each of these projections or shim supports 43 has a number affixed thereto. This number identifies the number of the particular shim. Desirably, as shown in FIG. 9, an easel stand 49 may project out from the rear of the support 42 and maintain the support 42 in a slightly inclined position. This easel stand 49 may be of the common type which may be folded in back of the support for shipping purposes or when it is desired to store the unit 42.

It will be readily seen that the mechanic can, by the use of a suitable chart, quickly determine which shim should be used to provide the desired correction. The shim is inserted by removing the wheel locking mechanism and drive gear, removing the internal parts from the hub 21, then removing the hub and brake backing plate. Before removing the spindle, it is desirable to make an indexing mark so that the spindle can be placed back in its original position. After cleaning the parts and providing the necessary service which is desirable with the front axle structure disassembled, a shim 32 of the desired taper is placed between the surfaces 28 and 31. Where, as is common, there is positive camber and it is desired to have a correction, to zero, the shim is inserted with the thin portion up and the thick portion down, as shown in the drawing. The spindle 21 is replaced with the spindle in the same angular position as it occupied before, as indicated by the marks applied to it prior to disassembly. Bolts 25 are then tightened to the recommended degree by the use of a suitable torque wrench. The tightening of the bolts 25 will result in compression of the annular ridges 34 and 36, making a thorough seal between the surfaces 28 and 31 of the steering knuckle 27 and the spindle 21.

Because of the resiliency of the shims 32, a continuous force is exerted on the bolts. This makes it more difficult to loosen the bolts and hence decreases the likelihood of the bolts loosening during use of the vehicle.

As will be clear from FIGS. 2 and 7, the outer edge of the shim 32 is always visible. Thus, if any question arises as to what shim was used, it is possible merely by looking at the edge of the shim to determine the thickness of shim that was used.

Figure 8:
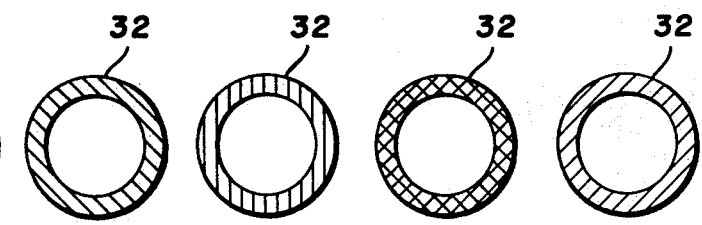
FIG. 8 is a view showing a plurality of the shims, each lined for color to show the different colors of various shims.

In FIG. 8, we have illustrated how the shims may be each of a different color by showing five shims color lined respectively, proceeding from left to right, for blue, green, pink, orange and brown. It is, of course, understood, as is obvious from FIG. 9, that a much greater variety of colors of shims can be employed. Normally, each shim on a separate support 43 of the rack 42 will have a different color.

It will be seen that with this arrangement, it is possible to get an extremely tight seal between the spindle and the steering knuckle. Furthermore, it is readily possible for the user to determine quickly which shim should be used because of the numbers applied thereto and because of the different colors associated with each shim. Because of the annular sealing ridges being slightly displaced, it is possible to combine any two shims and still maintain a very tight seal between the two shims and between the shims and the adjacent surfaces. When the axle assembly has been put together again with the shims in it, it is possible at all times to determine what shims were used so that in case the operation is not satisfactory, it is possible for someone inspecting the device to readily determine whether the incorrect operation is due to the fact that the wrong shims were used.

Because the shims are light, as compared to metal shims, it is possible to mount these on a relatively simple inexpensive rack which will readily display the various shims and to enable one quickly to determine which shim should be taken for use to effect the desired correction and camber.

While we have shown a specific embodiment of our invention for purposes of illustration, it is to be understood that the scope of the invention is limited solely by that of the appended claims.

What we claim is:

1. In a steering drive axle assembly having an axle housing, a driving axle in said housing, a driven axle, a universal joint connecting said driving axle and said driven axle, a second housing surrounding said driven axle, a wheel hub member surrounding and rotatably secured to said second housing and secured to said driven axle to be rotated thereby, an intermediate annular member pivotally secured to said axle housing and detachably clamped to said second housing to pivotally connect said second housing to said axle housing, said second housing and said annular member having adjacent mating surfaces, and detachable means for clamping said mating surfaces together, and means for controlling the camber of the wheel secured on said hub member, said means comprising a resilient annular tapered shim disposed in mating relation between said mating surfaces and being formed of a non-metallic compressible plastic material of high impact strength and a compressive strength at yield within the range of 17,000 to 45,000 lbs. per square inch, such as is provided by nylon having a filler of glass beads.

2. The combination of claim 1 in which said shim is yieldably compressible and has a compressive strength at yield of the order of 25,000 to 38,000 lbs. per square inch.

3. The combination of claim 1 in which said shim has at least one relatively narrow annular ridge on at least one face thereof to aid in forming a fluid tight seal with the adjacent one of said mating surfaces.

4. The combination of claim 3 in which said tapered annular shim has at least one annular ridge on each face thereof to aid in forming fluid tight seals with both of said mating surfaces, and to provide resilient back pressure on the clamping means.

5. The combination of claim 4 in which the annular ridge on one face thereof is displaced radially with respect to the annular ridge on the other face thereof so that when two such shims are used together, the meeting annular ridges engage each other sidewise rather than directly abutting each other.

6. The combination of claim 1 in which said shim is of a color indicating the thickness of said shim, the edge of said shim being visible from outside of said second housing so that the thickness of the shim can be determined without detaching said second housing from said intermediate member.

7. The combination of claim 1 in which the shim has an outside diameter of the value of 4¾ inches and the thickness of the thickest portion of said annular tapered shim is of the order of 0.02 to 0.13 inch greater than the thickness of the thinnest portion thereof.

8. The combination of claim 1 in which said tapered annular shim has the resilient and yieldably compressible characteristics provided by a composition comprising nylon plastic having a filler of glass beads, said beads making up 20 to 40 percent by weight of said composition.

9. The combination of claim 1 in which said shim is one of a plurality of shims each of a different color and of a different maximum thickness, each color denoting a different thickness.

10. As a new article of manufacture, a non-metallic, resilient, annular tapered shim, adapted to be used between the annular mating faces or surfaces of a driving axle housing and a driven axle housing and useful in controlling camber of a wheel mounted on a steerable driven axle, said shim being made of a yieldably compressible plastic material of high impact strength and a compressive strength at yield of the order of 29,000 to 36,500 lbs. per square inch, such as is provided by nylon having a filler of glass beads, said annular shim having surfaces or faces between the inner and outer circumferences thereof, and at least one relatively narrow annular ridge on at least one face thereof to aid in forming a fluid tight seal with the adjacent one of said mating surfaces.

11. A shim as defined in claim 10 in which a first relatively narrow annular ridge on one face thereof is located inwardly of the inner circumference of said annular shim and a second relatively narrow annular ridge on the opposite face of said shim is located inwardly of said inner circumference of said shim a slightly greater distance than said first ridge so that when a plurality of said shims are used together, the annular ridge of one shim will be slightly radially displaced with respect to the adjacent annular ridge of the adjacent shim so that they will engage each other in a closely fitting side by side relation to provide a tight seal when clamped between mating surfaces of a steering drive axle assembly.

12. A plurality of shims of different thicknesses as defined in claim 10 wherein each shim is of a color indicating the thickness of said shim and the material of the shim is a 30–40 percent glass filled nylon.

13. A plurality of the tapered shims as defined in claim 10, to provide different amounts of taper and hence different degrees of camber correction, one shim differing from the one closest to it in camber by about ⅛ degree of camber correction, each different shim being of a different color and also having an identifying number recessed and molded into its mating surface.

14. In a steering drive axle assembly having an axle housing, a driving axle in said housing, a driven axle, a universal joint connecting said driving axle and said driven axle, a second housing surrounding said driven axle, a wheel hub member surrounding and rotatably secured to said second housing and secured to said driven axle to be rotated thereby, an intermediate annular member pivotally secured to said axle housing and detachably clamped to said second housing to pivotally connect said second housing to said axle housing, said second housing and said annular member having adjacent mating surfaces, and detachable means for clamping said mating surfaces together, means for controlling the camber of the wheel secured on said hub member, said means comprising a resilient annular tapered shim disposed in mating relation between said mating surfaces and being formed of a non-metallic compressible plastic material of high impact strength and a compressive strength at yield of the order of 25,000 to 36,500 lbs. per square inch, such as is provided by nylon having a filler of glass beads.

15. The shim of claim 14 in which the shim is a tapered shim having a plan configuration similar to that of at least one of said mating surfaces.

16. The combination of claim 14 in which said shim is formed of a 30–40 percent glass bead filled Nylon.

17. In a steering assembly, for an automobile or other vehicle, having a first housing, a second housing, a wheel hub member surrounding and rotatably secured to said second housing, an intermediate annular member pivotally secured to said first housing and detachably clamped to said second housing to pivotally connect said second housing to said first housing, said second housing and said annular member having adjacent mating surfaces, and detachable means for clamping said mating surfaces together, means for controlling the camber of the wheel secured on said hub member, said means comprising a molded, non-metallic, resilient annular tapered shim having surfaces or faces between the inner and outer circumferences thereof, said shim being in mating relation between said mating surfaces and being formed of a compressible plastic material of high impact strength and a compressive strength at yield of the order of 25,000 to 36,500 lbs. per square inch, such as is provided by nylon having a filler of glass beads.

18. The combination of claim 17 in which said shim has a relatively narrow annular ridge on at least one face thereof to aid in forming a fluid tight seal with the adjacent one of said mating surfaces.

19. The combination of claim 18 in which said shim has such an annular ridge on each face thereof to aid in forming fluid tight seals with both of said mating surfaces.

20. The combination of claim 19 in which the annular ridge on one face thereof is displaced radially with respect to the annular ridge on the other face thereof so that when two such shims are used together, the meeting annular ridges engage each other sidewise rather than directly abutting each other.

* * * * *